United States Patent

Haswell

[15] 3,646,938
[45] Mar. 7, 1972

[54] POSTPARTUM BLOOD LOSS RECEPTACLE

[72] Inventor: John N. Haswell, 607 Dubois Street, Vincennes, Ind. 47591

[22] Filed: July 27, 1970

[21] Appl. No.: 64,083

Related U.S. Application Data

[63] Continuation of Ser. No. 652,132, July 10, 1967, abandoned.

[52] U.S. Cl. ...........................................................128/292
[51] Int. Cl. ..................................................................A61f 5/44
[58] Field of Search ..................................128/275, 292, 132

[56] References Cited

UNITED STATES PATENTS

| 807,599 | 12/1905 | Cave | 128/295 |
| 1,033,717 | 7/1912 | McClellan | 128/275 X |
| 2,669,720 | 2/1954 | Vandekerch | 128/132 X |
| 3,199,507 | 8/1965 | Kamm | 128/292 X |
| 3,371,897 | 3/1968 | Serany, Jr. et al. | 128/275 |
| 3,386,444 | 6/1968 | Brenner et al. | 128/292 |
| 3,452,750 | 1/1969 | Blanford | 128/292 X |

FOREIGN PATENTS OR APPLICATIONS

| 1,026,786 | 4/1966 | Great Britain | 128/295 |

*Primary Examiner*—Charles F. Rosenbaum
*Attorney*—Woodard, Weikart, Emhardt & Naughton

[57] ABSTRACT

A thin pliable sheet having concentric graduations for receiving and measuring postpartum blood loss.

3 Claims, 3 Drawing Figures

PATENTED MAR 7 1972
3,646,938
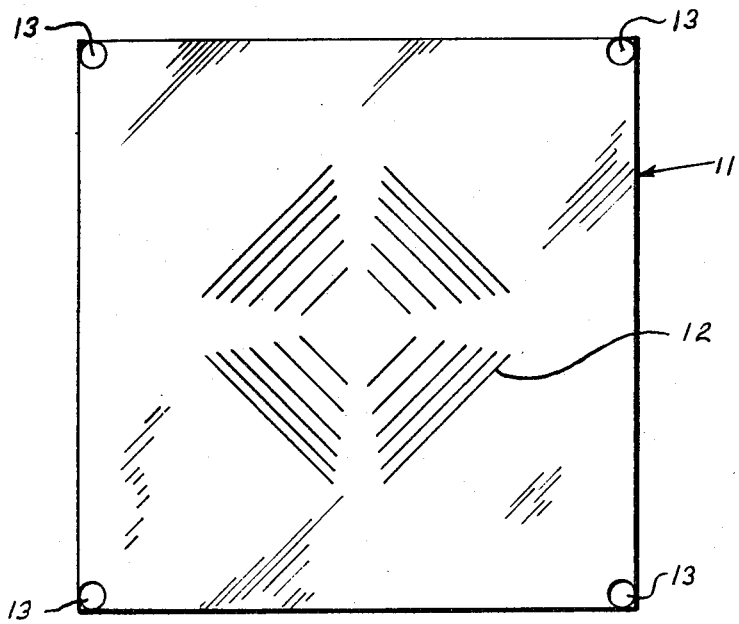
Fig.1
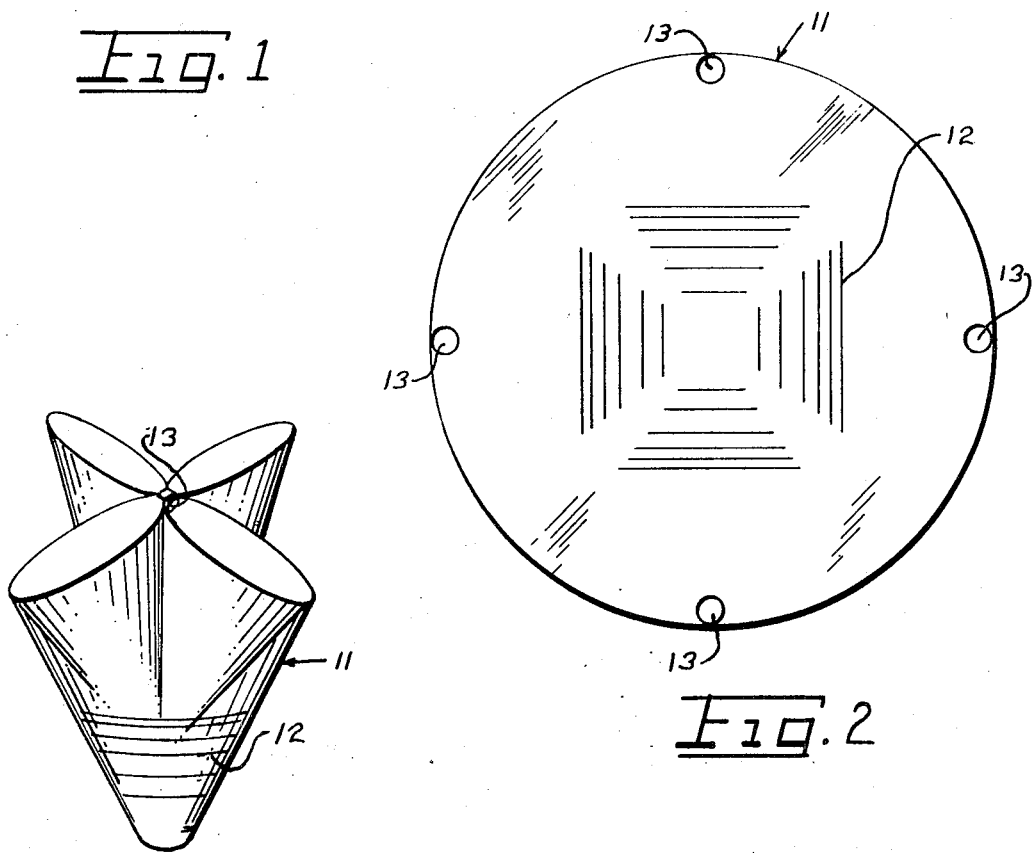
Fig.2
Fig.3
INVENTOR.
JOHN N. HASWELL
BY
Woodard, Weikart, Emhardt & Naughton
Attorneys

POSTPARTUM BLOOD LOSS RECEPTACLE

This application is a continuation of Ser. No. 652,132 filed July 10, 1967 and now abandoned.

BACKGROUND OF THE INVENTION

1. Field of the Invention

The field of the invention is generally surgery, and more particularly obstetric devices.

2. Description of the Prior Art

The importance of monitoring blood loss is well recognized in the field of obstetrics. For this reason, considerable effort has been expended in attempts to refine and improve the techniques and devices used to measure blood loss in the delivery room. See, for example, Kamm, U.S. Pat. No. 3,199,507, which discloses a blood loss measure for use on a delivery table.

Not only is it important to monitor blood loss in the delivery room, but also in the recovery room and even after the parturient has been removed from the recovery room to her hospital bed. Generally, after the patient is taken from the delivery room, there is not a doctor constantly in attendance with the patient, and nurses and other trained personnel are relied upon to monitor blood loss and other indications. It is imperative, therefore, that any device used to measure blood loss after the patient has been removed from the delivery room be reliable, simple in construction, and comparatively simple to use, not requiring the expert knowledge of a medical doctor.

One such device is disclosed in Wegryn et al., U.S. Pat. No. 3,245,068, which uses a variable resistance electrical circuit to detect the loss of body fluids.

Although the Wegryn et al. device does provide an alarm, it is susceptible to large errors in measurement and cannot be used to measure an unknown volume, but only to indicate whether the unknown volume exceeds a predetermined volume.

There is a need for a device which is capable of measuring with a fair degree of accuracy the volume of postpartum blood loss. The device of the present invention meets this requirement and furthermore, is simple in construction, economical and easy to use.

SUMMARY OF THE INVENTION

A postpartum blood loss receptacle for receiving and measuring postpartum blood loss. There is a thin, pliable sheet formed of transparent plastic film or similar material and having a set of concentric graduations thereon. The sheet may be square, round, or any other desirable shape.

In use the sheet is placed under the parturient so that it receives any pospartum blood loss. When it is desired to measure the amount of the blood loss, the sheet is carefully removed from beneath the patient, the the corners brought together, and the sheet held pendantly by the corners. If a circular sheet is used, four support points may be marked on the sheet to be brought together like the four corners of a square sheet.

Each graduation is in the form of a closed line substantially centered about the center of the sheet. The shape of the graduations is dependent upon the number of support points. When four support points, such as the corners of a square sheet, are used, the graduations will be substantially square and diagonal to the edges of the sheet when the sheet is opened flat. When the corners are brought together and the sheet held pendantly, the graduations are substantially horizontal.

It is therefore an object of the present invention to provide an improved postpartum blood loss receptacle.

It is another object of the present invention to provide a postpartum blood loss receptacle that is simple to use, not requiring the expert knowledge of a medical doctor.

It is a further object of the present invention to provide a postpartum blood loss receptacle that is economical to use and which may readily be disposed of after one use.

It is a further object of the present invention to provide a postpartum blood loss receptacle which may be used not only to receive blood, but also to measure it.

These and other objects and advantages of the present invention will become apparent as the description proceeds, reference being had to the attached drawings and appended claims.

BRIEF DESCRIPTION OF THE DRAWINGS

FIG. 1 is a plan view of one embodiment of the device of the present invention.

FIG. 2 is a plan view of another embodiment of the device of the present invention.

FIG. 3 is a perspective view showing the embodiment of FIG. 1 in a pendantly held position.

DESCRIPTION OF THE PREFERRED EMBODIMENTS

Referring now to FIG. 1, there is shown one embodiment of the device of the present invention having a sheet 11, graduations 12 and support points 13. The sheet 11 may be made in any convenient size, and is formed of thin, pliable material, such as plastic film. The sheet 11 may be opaque, translucent or transparent, but for ease of reading the graduations, is preferably transparent.

FIG. 2 shows a second embodiment of the device of the present invention, differing from the embodiment of FIG. 1, in that the sheet 11 is circular in shape rather than square, having support points 13 positioned about its circumference. It will be noted that the configuration and position of the graduations 12 in FIG. 2 are substantially identical with respect to the support points 13 as they appear in FIG. 1.

More or fewer support points may be used. For example, if three support points are used, the graduations would have a substantially triangular shape. Similarly, if five support points are used, the graduations would be substantially pentagonal. This is because the configuration of the sheet when held pendantly by the support points depends upon the number of support points.

In use, the sheet 11 is placed under the buttocks and thighs of the parturient and in that position receives any postpartum blood loss. Because the blood is collected more or less in a puddle, it is much easier to estimate the amount of blood loss at a glance than if absorbent pads are used to soak up the blood loss. When it is desired to measure the amount of blood loss, the sheet 11 is carefully removed from beneath the patient, care being taken not to spill any of the blood. The sheet is then held pendantly by the support points 13 as best shown in FIG. 3, and the amount of blood loss read directly by aid of the graduations 12. The graduations 12 may be in any increment desired, such as 50 cc., 100 cc., 150 cc., 200 cc., etc.

It will be seen that the postpartum blood loss receptacle of the present invention is simple in construction, economical to manufacture, and simple to use, not requiring the expert knowledge of a medical doctor. It is easily used by nurses and nurses'aides. Furthermore, it can be used without any special arrangement of the hospital bed.

In some applications it may be desirable to increase or decrease the number of support points 13. If such a modification is made, the configuration of the graduations can be changed accordingly.

The invention claimed is:

1. The method of collecting and measuring postpartum blood loss which comprises the steps of:
   a. placing graduations on a thin impervious substantially flat pliable sheet;
   b. placing the sheet under the buttocks of a patient;
   c. collecting the blood in a semisolid gelatinous type mass on the sheet;
   d. grasping the sheet at predetermined support points adjacent the outer periphery of the sheet;
   e. holding the sheet pendantly at said support points;
   f. and reading the blood loss directly by aid of said graduations.

2. The method of claim 1 comprising the additional step of:
g. estimating blood loss, prior to said grasping and after said collecting, by observing the amount of blood on said sheet in its substantially flat condition.

3. The method of collecting and measuring postpartum blood loss which comprises the steps of:
a. placing a thin impervious substantially flat pliable sheet having graduations thereon under the buttocks of the patient;
b. collecting the blood in a semisolid gelatinous type mass on the sheet;
c. grasping the sheet at predetermined support points adjacent to the outer periphery of the sheet;
d. holding the sheet pendantly at said support points;
e. and reading the blood loss directly by aid of said graduations.

\* \* \* \* \*